United States Patent
Lee

(10) Patent No.: US 11,201,011 B2
(45) Date of Patent: Dec. 14, 2021

(54) MULTI-LAYERED CERAMIC CAPACITOR

(71) Applicant: SAMSUNG ELECTRO-MECHANICS CO., LTD., Suwon-si (KR)

(72) Inventor: Sun Cheol Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 44 days.

(21) Appl. No.: 16/690,410

(22) Filed: Nov. 21, 2019

(65) Prior Publication Data

US 2021/0043379 A1 Feb. 11, 2021

(30) Foreign Application Priority Data

Aug. 8, 2019 (KR) .................. 10-2019-0096691

(51) Int. Cl.
*H01G 4/012* (2006.01)
*H01G 4/224* (2006.01)
(Continued)

(52) U.S. Cl.
CPC ............. *H01G 4/012* (2013.01); *H01G 4/224* (2013.01); *H01G 4/232* (2013.01); *H01G 4/30* (2013.01)

(58) Field of Classification Search
CPC ........ H01G 4/012; H01G 4/224; H01G 4/232; H01G 4/30; H01L 23/645;
(Continued)

(56) References Cited

U.S. PATENT DOCUMENTS 5,583,738 A * 12/1996 Kohno ................... H01G 4/385
361/312
5,892,415 A * 4/1999 Okamura ............ H01P 1/20345
333/175

(Continued)

FOREIGN PATENT DOCUMENTS

CN         1145259 C     4/2004
CN       102915838 A     2/2013
(Continued)

OTHER PUBLICATIONS

Office Action issued in corresponding Chinese Patent Application No. 202010071744.8 dated Sep. 16, 2021, with English translation.

*Primary Examiner* — Timothy J Thompson
*Assistant Examiner* — Michael F McAllister
(74) *Attorney, Agent, or Firm* — Morgan, Lewis & Bockius LLP

(57) ABSTRACT

A multilayer ceramic capacitor includes a body including a first dielectric layer on which a first internal electrode, a first coupling portion, and a second internal electrode are disposed, a second dielectric layer on which a third internal electrode, a second coupling portion, and a fourth internal electrode are disposed, and a third dielectric layer on which a fifth internal electrode or a sixth internal electrode is disposed, and first and second external electrodes connected to the first to sixth internal electrodes, and disposed on both surfaces of the body in the first direction. The first to third dielectric layers are sequentially stacked.

17 Claims, 13 Drawing Sheets

(51) Int. Cl.
*H01G 4/232* (2006.01)
*H01G 4/30* (2006.01)

(58) Field of Classification Search
CPC ... H01L 2924/0002; H01L 2924/12044; H01L 2924/3011; H01L 2924/00
USPC ...................................................... 361/301.4
See application file for complete search history.

(56) References Cited

U.S. PATENT DOCUMENTS

| | | | |
|---|---|---|---|
| 6,437,665 B1 * | 8/2002 | Kato | H03H 3/00 333/185 |
| 6,577,491 B1 * | 6/2003 | Ohtsuka | H01G 4/385 29/25.42 |
| 6,768,630 B2 * | 7/2004 | Togashi | H01G 4/232 361/302 |
| 7,558,049 B1 * | 7/2009 | Togashi | H01G 4/005 361/303 |
| 7,636,230 B2 * | 12/2009 | Aoki | H01G 4/012 361/303 |
| 8,107,214 B2 * | 1/2012 | Aoki | H01G 4/012 361/303 |
| 8,233,262 B2 * | 7/2012 | Togashi | H01G 4/385 361/301.4 |
| 2010/0232084 A1 * | 9/2010 | Niki | H01L 23/645 361/301.4 |
| 2011/0255209 A1 | 10/2011 | Ishida et al. | |
| 2012/0313743 A1 * | 12/2012 | Kimura | H01F 17/0013 336/200 |
| 2013/0033154 A1 | 2/2013 | Sakuratani et al. | |
| 2015/0213956 A1 | 7/2015 | Choi et al. | |

FOREIGN PATENT DOCUMENTS

| | | |
|---|---|---|
| CN | 103811182 A | 5/2014 |
| CN | 206293293 U | 6/2017 |
| EP | 0 774 797 A2 | 6/1999 |
| JP | H09-129497 A | 5/1997 |
| JP | 2011-228334 A | 11/2011 |
| KR | 10-2015-0089140 A | 8/2015 |
| KR | 10-2016-0142035 A | 12/2016 |

* cited by examiner

MULTI-LAYERED CERAMIC CAPACITOR

CROSS-REFERENCE TO RELATED APPLICATION(S)

This application claims the benefit of priority to Korean Patent Application No. 10-2019-0096691 filed on Aug. 8, 2019 in the Korean Intellectual Property Office, the disclosure of which is incorporated herein by reference in its entirety.

TECHNICAL FIELD

The present disclosure relates to a multilayer ceramic capacitor.

BACKGROUND

Among capacitor components, a multilayer ceramic capacitor (MLCC) has advantages of small size, high capacity, and ease of mounting.

In recent years, a ceramic electronic component, especially, a multilayer ceramic capacitor, has been implemented with ultra-high capacity according to market demand. In order to secure such capacity, the number of stacked layers must be increased, but as the number of stacked layers increases, reliability of the chip may decrease.

This problem is due to a step by a thickness of the internal electrode increases as the number of stacked layers increases. As the number of stacked layers increases, a dielectric layer may be elongated to fill the step, which may cause delamination between an active layer and a cover layer and a crack in a calcination process.

Therefore, there is a demand for development of a multilayer ceramic capacitor that is ultra small with ultra high-capacity and which satisfies mechanical reliability and moisture resistance reliability of the chip.

SUMMARY

An aspect of the present disclosure is to provide a multilayer ceramic capacitor having improved mechanical strength.

Another aspect of the present disclosure is to provide a multilayer ceramic capacitor having excellent moisture resistance reliability.

Another aspect of the present disclosure is to provide a multilayer ceramic capacitor capable of securing high capacity while preventing cracks or delamination.

According to an embodiment of the present disclosure, a multilayer ceramic capacitor may be provided. The multilayer ceramic capacitor includes a body including a first dielectric layer on which a first internal electrode, a first coupling portion, and a second internal electrode are disposed, a second dielectric layer on which a third internal electrode, a second coupling portion, and a fourth internal electrode are disposed, and a third dielectric layer on which a fifth internal electrode or a sixth internal electrode is disposed, and including fifth and sixth surfaces opposed in a first direction, third and fourth surfaces opposed in a second direction, and first and second surfaces opposed in a third direction; and first and second external electrodes connected to the first to sixth internal electrodes, and disposed on both surfaces of the body in the first direction. The first to third dielectric layers are sequentially stacked.

BRIEF DESCRIPTION OF DRAWINGS

The above and other aspects, features, and advantages of the present disclosure will be more clearly understood from the following detailed description taken in conjunction with the accompanying drawings, in which:

FIG. 13 is a perspective view illustrating a stacking procedure of internal electrodes to which FIGS. 11 and 12 are applied.

DETAILED DESCRIPTION

Figure 1:
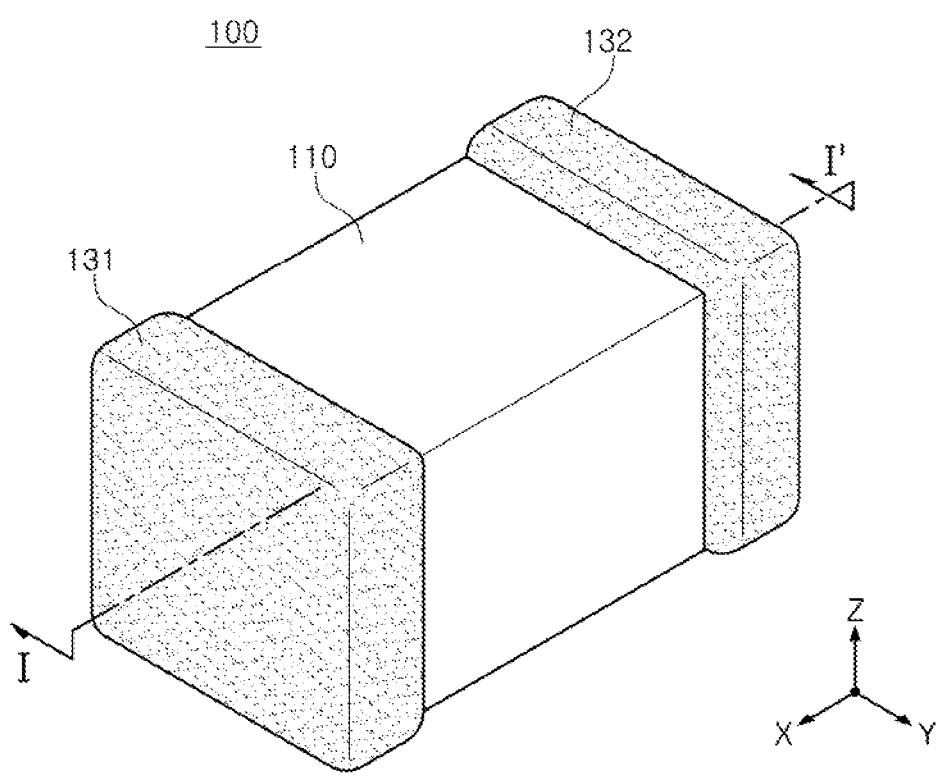
FIG. 1 is a schematic perspective view illustrating a multilayer ceramic capacitor according to an embodiment of the present disclosure.
Figure 2:
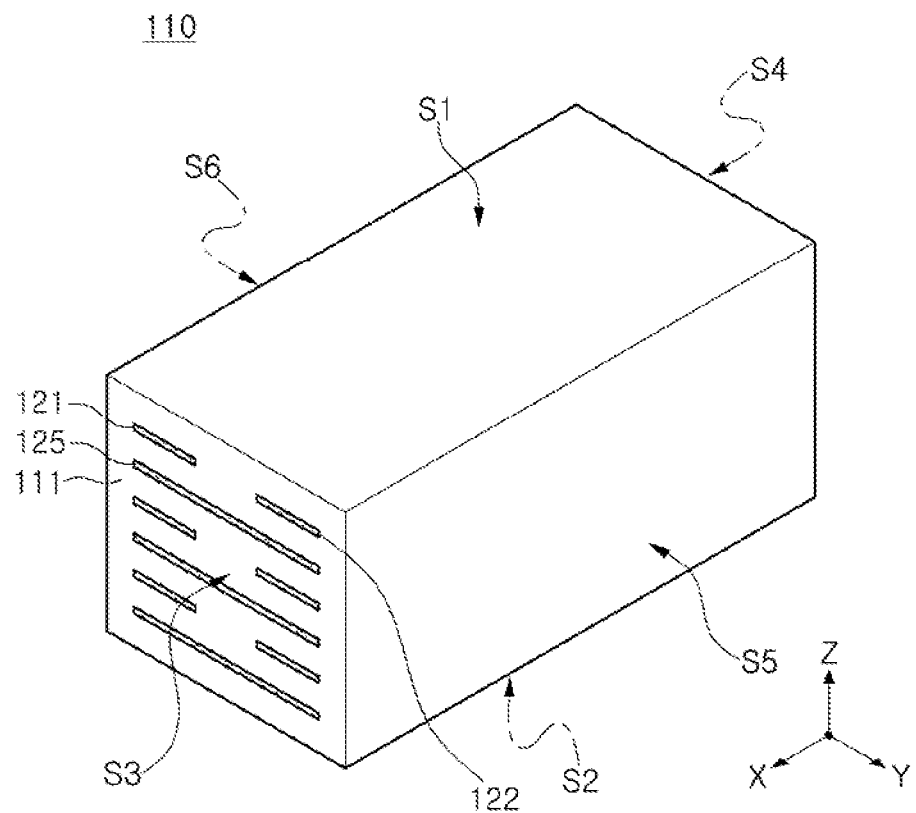
FIG. 2 is a perspective view illustrating the body of FIG. 1.
Figure 3:
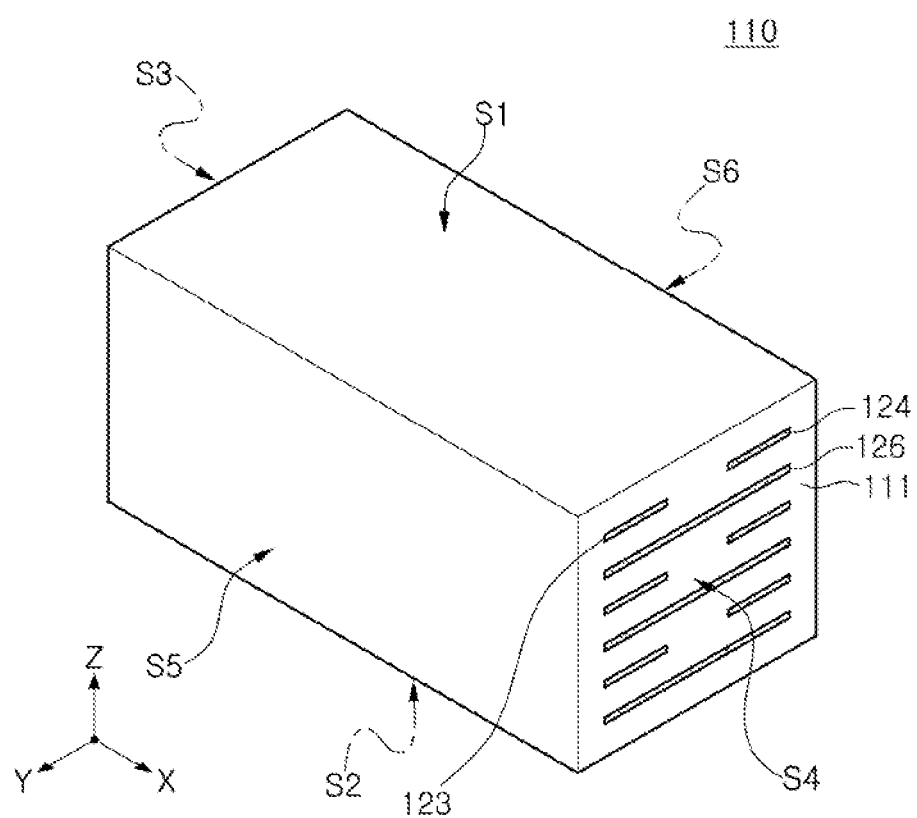
FIG. 3 is a perspective view of the body of FIG. 2 viewed from another direction.

Hereinafter, embodiments of the present disclosure will be described as follows with reference to the attached drawings. The present disclosure may, however, be exemplified in many different forms and should not be construed as being limited to the specific embodiments set forth herein. Rather, these embodiments are provided so that this disclosure will be through and complete, and will fully convey the scope of the disclosure to those skilled in the art. Accordingly, shapes and sizes of elements in the drawings may be exaggerated for clarity of description, and elements indicated by the same reference numeral are same elements in the drawings.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numerals. Throughout the specification, when a component is referred to as "comprise" or "comprising," it means that it may include other components as well, rather than excluding other components, unless specifically stated otherwise.

In the drawings, an X direction may be defined as a first direction and an L direction or a length direction, a Y direction may be defined as a second direction, a W direction or a width direction, and a Z direction may be defined as a third direction, a T direction and a thickness direction.

Hereinafter, a multilayer ceramic capacitor according to an embodiment of the present disclosure will be described in detail with reference to FIGS. 1 to 8.

A multilayer ceramic capacitor 100 according to an embodiment of the present disclosure may include a body 110 including a first dielectric layer on which a first internal electrode 121, a first coupling portion 141, and a second internal electrode 122 are disposed, a second dielectric layer on which a third internal electrode 123, a second coupling portion 142, and a fourth internal electrode 124 are disposed, and a third dielectric layer on which a fifth internal electrode 125 or a sixth internal electrode 126 is disposed, and having fifth and sixth surfaces S5 and S6 opposing each other in a first direction and first and second surfaces S1 and S2 opposing in a third direction; and first and second external electrodes 131 and 132 disposed on both surfaces of the body 110 in the first direction. In this case, the first to third dielectric layers may be sequentially stacked and disposed in the Z (i.e., the third) direction.

The specific shape of the body 110 is not particularly limited, but as illustrated, the body 110 may be formed to have a hexahedral or similar shape. Due to shrinkage of the ceramic powder contained in the body 110 during a firing process, the body 110 may have a substantially hexahedral shape, although it may not be a hexahedral shape with completely straight lines.

The body 110 may have first and second surfaces S1 and S2 opposing each other in a thickness direction (Z direction), third and fourth surfaces S3 and S4 connected to the first and second surfaces S1 and S2 and opposing each other in a width direction (Y direction), and fifth and sixth surfaces S5 and S6 connected to the first and second surfaces S1 and S2 and connected to the third and fourth surfaces S3 and S4 and opposing each other in a length direction (X direction). In this case, one surface selected from the first, second, fifth, and sixth surfaces S1, S2, S5, and S6 may be a mounting surface.

The plurality of dielectric layers 111 forming the body 110 are in a sintered state, and a boundary between adjacent dielectric layers 111 may be integrated, such that it may be difficult to confirm without using a scanning electron microscope (SEM).

According to an embodiment of the present disclosure, a raw material for forming the dielectric layer 111 is not particularly limited as long as sufficient electrostatic capacitance may be obtained therewith. For example, the raw material for forming the dielectric layer 511 may be a barium titanate ($BaTiO_3$) material, a lead composite perovskite material, a strontium titanate ($SrTiO_3$) material, or the like. The barium titanate-based material may include $BaTiO_3$-based ceramic powder, and examples of the ceramic powder may be $(Ba_{1-x}Ca_x)TiO_3$, $Ba(Ti_{1-y}Ca_y)O_3$, $(Ba_{1-x}Ca_x)(Ti_{1-y}Zr_y)O_3$ or $Ba(Ti_{1-y}Zr_y)O_3$ in which calcium (Ca), zirconium (Zr), or the like, are partially dissolved in $BaTiO_3$. A material for forming the dielectric layer 111, various ceramic additives, organic solvents, plasticizers, binders, dispersants, and the like, may be added to powders such as barium titanate ($BaTiO_3$) according to the purpose of the present disclosure.

A cover portion having a predetermined thickness may be formed in a lower portion of a lowermost internal electrode and an upper portion of an uppermost internal electrode of the body 110. In this case, the cover portion may include the same component as that of the dielectric layer 111, and may be formed by stacking at least one dielectric layer constituting the cover portion in the upper portion of the uppermost internal electrode and the lower portion of the lowermost internal electrode of the body 110.

Meanwhile, the cover portion may be different from each other in the content of the dielectric layer and magnesium (Mg) in which the internal electrode is disposed. Accordingly, contactability with the internal electrode may be improved, and moisture resistance reliability may be improved by increasing density of the cover portion according to the content of magnesium (Mg).

Figure 4:
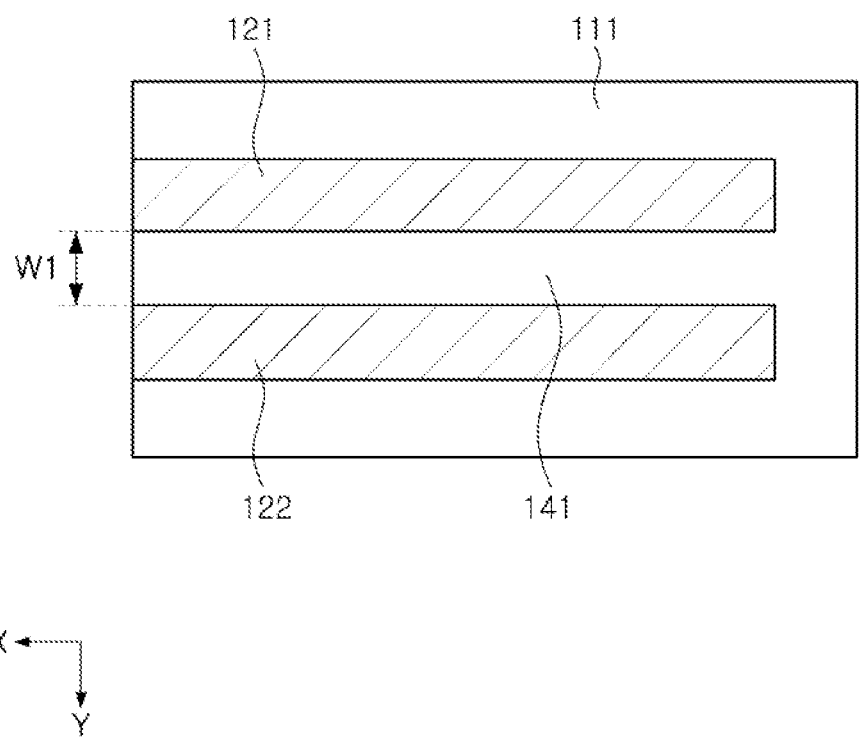
FIGS. 4 to 7 are plan views schematically illustrating internal electrodes according to an embodiment of the present disclosure.

The first dielectric layer may include a first internal electrode 121, a first coupling portion 141, and a second internal electrode 122. Referring to FIG. 4, the first coupling portion 141 may be disposed between the first internal electrode 121 and the second internal electrode 122. In this case, the first coupling portion 141 may mean a partial region of the first dielectric layer. The first coupling portion 141 may mean a region between the first internal electrode 121 and the second internal electrode 122 disposed on the first dielectric layer, and more specifically, the first coupling portion 141 may be located between the first internal electrode 121 and the second internal electrode 122 in the Y direction, and may mean an unallocated region of the first internal electrode 121 and the second internal electrode 122, for example may be a region of W1 of FIG. 4.

Figure 5:
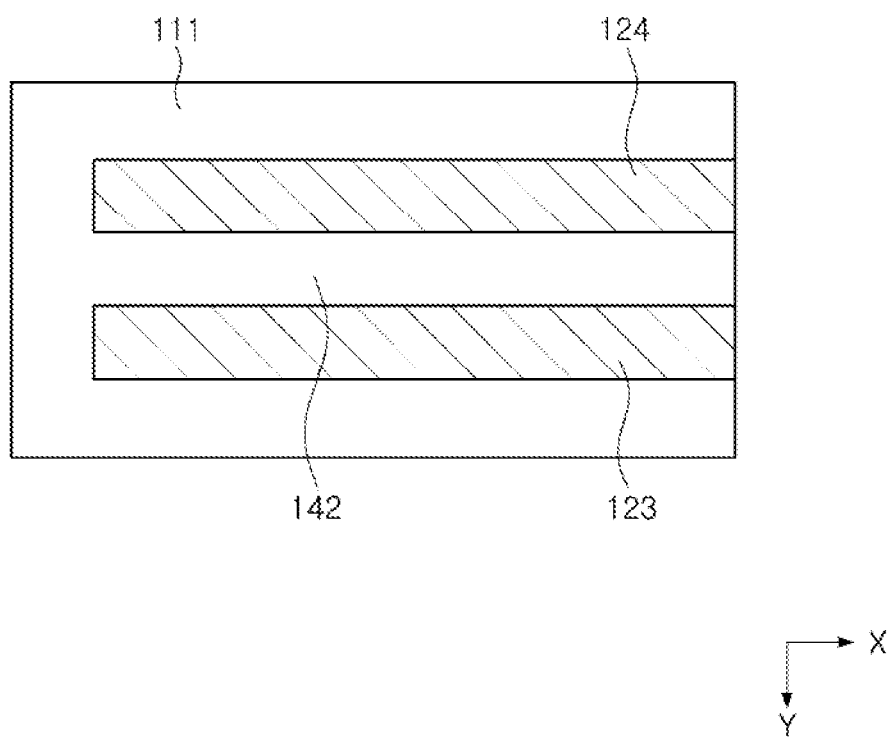

The second dielectric layer may include a third internal electrode 123, a second coupling portion 142, and a fourth internal electrode 124. Referring to FIG. 5, a second coupling portion 142 may be disposed between the third internal electrode 123 and the fourth internal electrode 124. In this case, the second coupling portion 142 may mean a partial region of the second dielectric layer. The second coupling portion 142 may mean a region between the third internal electrode 123 and the fourth internal electrode 124 disposed on the second dielectric layer, and more specifically, the second coupling portion 142 may be located between the third internal electrode 123 and the fourth internal electrode 124 in the Y direction, and may mean an unallocated region of the third internal electrode 123 and the fourth internal electrode 124. In a multilayer ceramic capacitor according to the present embodiment, a first coupling portion 141 and a second coupling portion 142 may be disposed on the dielectric layer to increase a bonding area between homogeneous materials, thereby improving mechanical strength of the capacitor chip.

In an embodiment of the present disclosure, the first coupling portion and the second coupling portion may be bonded. In the present specification, "adhesion" may mean a state in which surfaces of an adhering material and an adherend are coupled to each other by a coupling force of an interface. The coupling force of the interface may be due to chemical interaction between surface molecules of the adhering material and the adherend, or may be due to mechanical coupling. The first coupling portion and the second coupling portion may be bonded by physical or chemical coupling. When a tensile strength required to separate the first coupling portion from the second coupling portion is called as an adhesive force, the adhesive force between the first coupling portion and the second coupling portion is not particularly limited, buy may be, for example, 1 Mpa or more, 100 Gpa or less. In the present embodiment, the first coupling portion and the second coupling portion may be bonded by physical and/or chemical coupling to prevent delamination in the active layer.

The internal electrode may include a first internal electrode 121 and a second internal electrode 122 disposed on the same dielectric layer, a third internal electrode 123 and a fourth internal electrode 124 disposed on a different dielectric layer from the dielectric layer and disposed on the same dielectric layer, and a fifth internal electrode 125 and a sixth internal electrode 126 disposed on a dielectric layer different from the dielectric layer, respectively. In this case, a dielectric layer on which the first internal electrode 121 and the second internal electrode 122 are disposed may be defined as a first dielectric layer, a dielectric layer on which the third internal electrode 123 and the fourth internal electrode 124 are disposed may be defined as a second dielectric layer, and a dielectric layer on which the fifth internal electrode 125 or the sixth internal electrode may be defined as a third dielectric layer.

Figure 6:
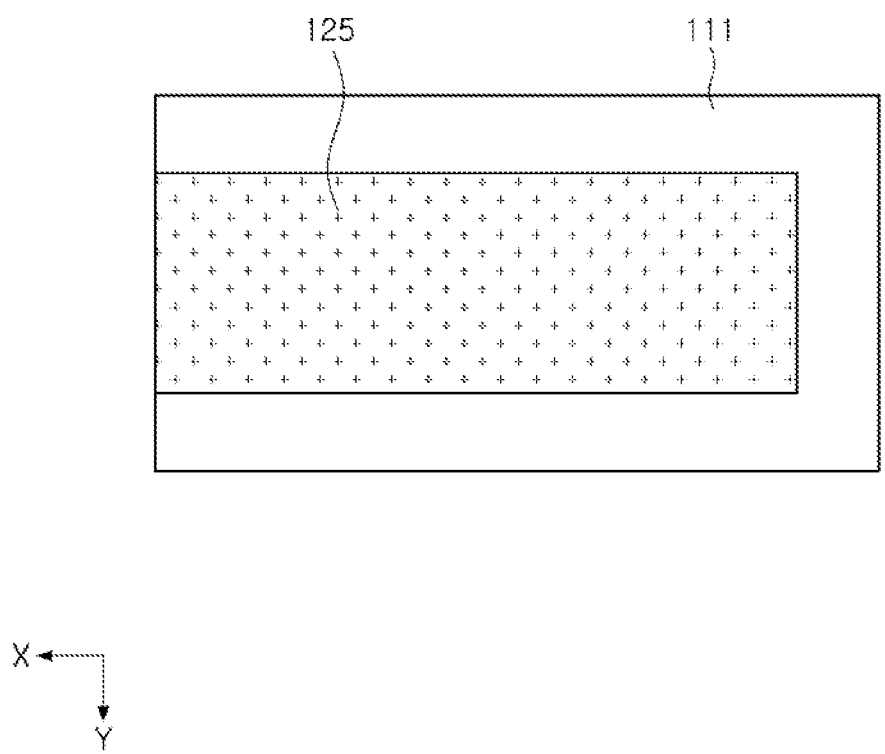
Figure 7:
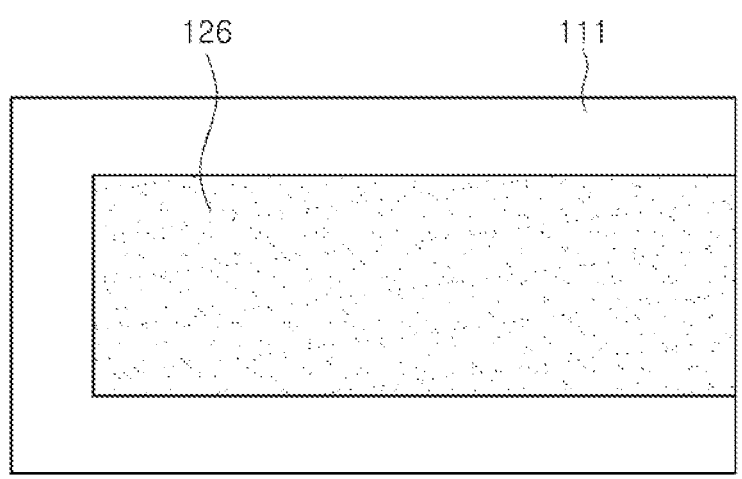
Figure 7:
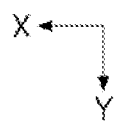
Figure 8:
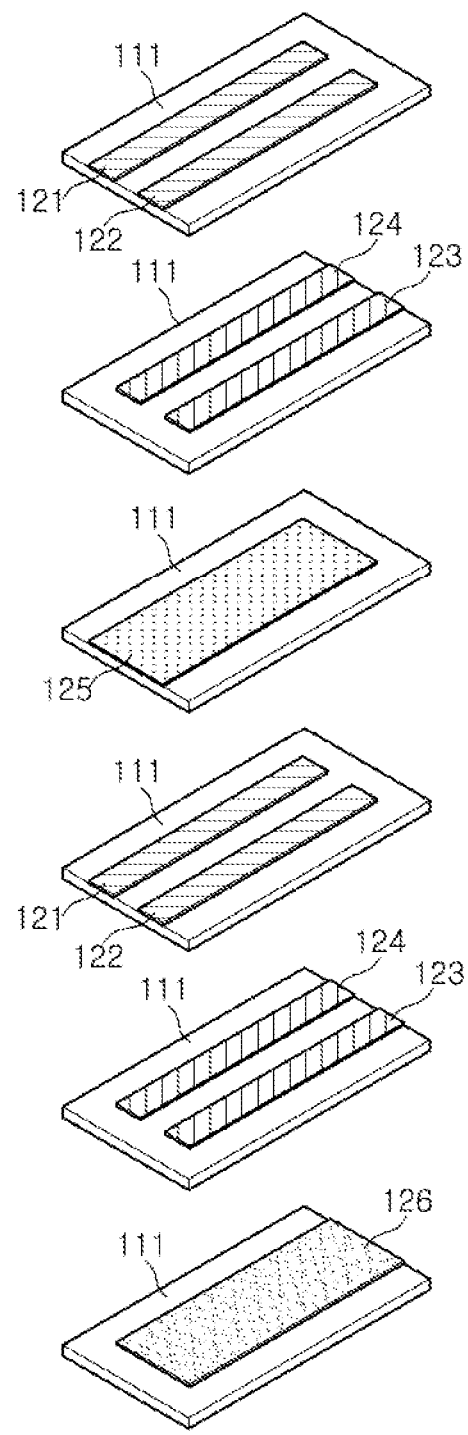
FIG. 8 is a perspective view illustrating a stacking procedure of internal electrodes of FIGS. 4 to 7.
Figure 9:
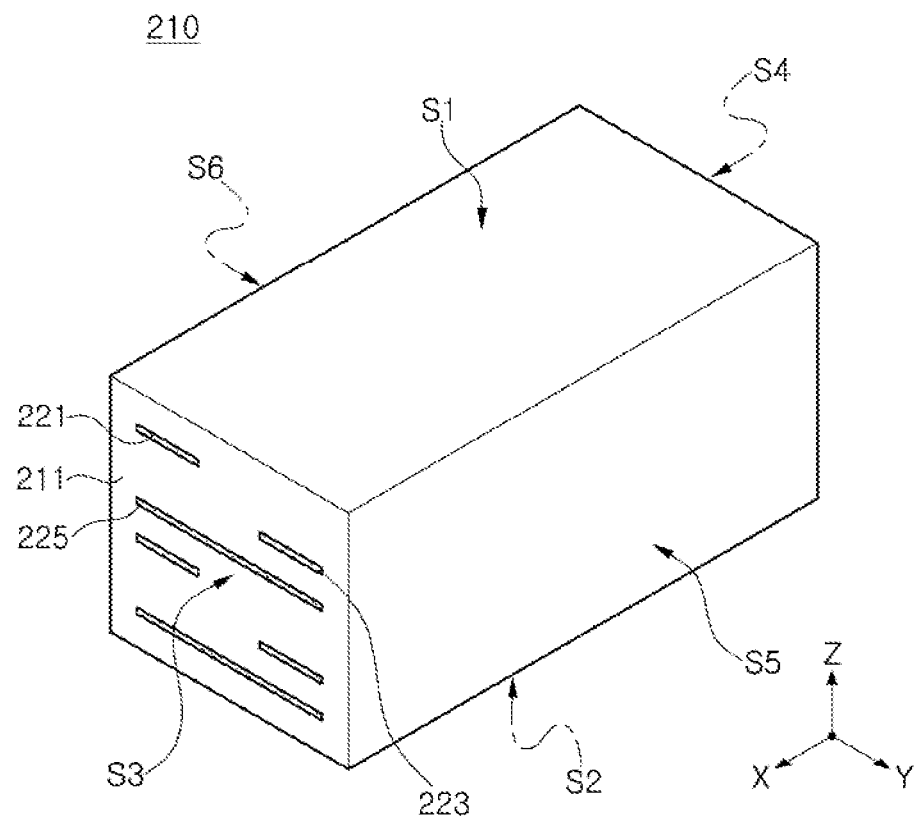
FIG. 9 is a perspective view illustrating a body according to another embodiment of the present disclosure.
Figure 10:
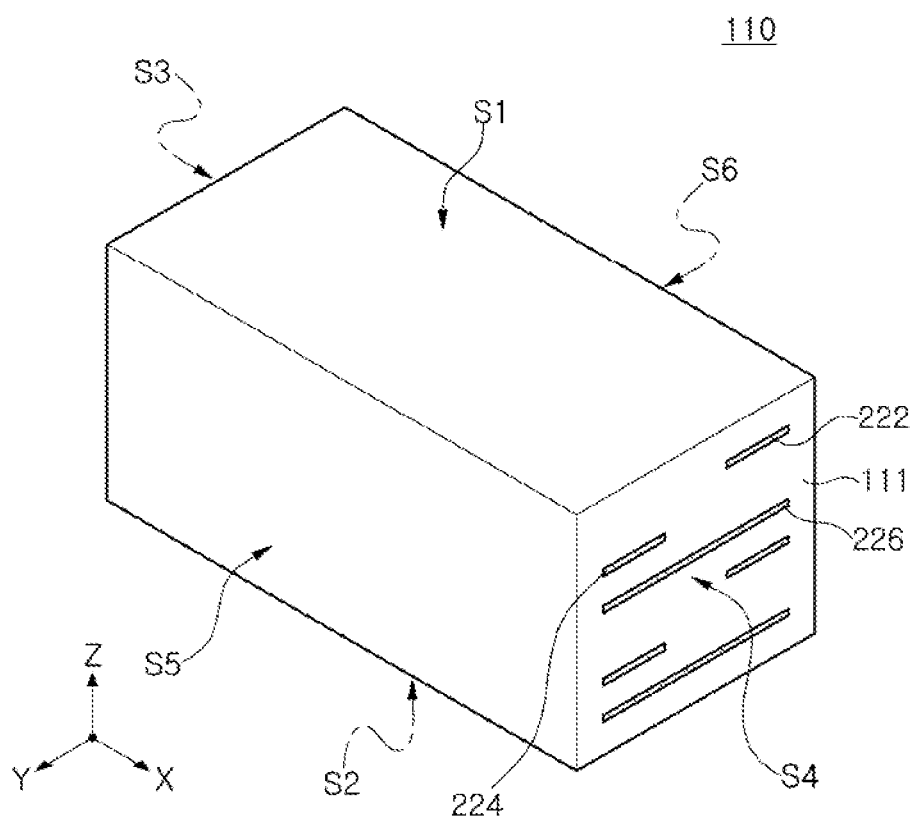
FIG. 10 is a perspective view of the body of FIG. 9 viewed from another direction.
Figure 11:
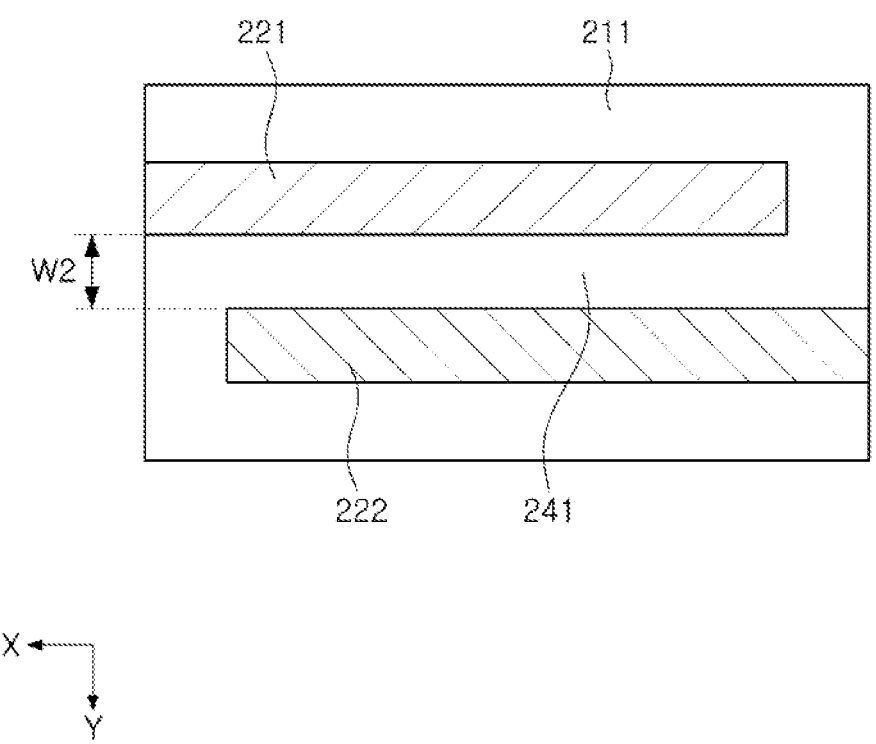
FIGS. 11 and 12 are plan views schematically illustrating internal electrodes according to another embodiment of the present disclosure.
Figure 12:
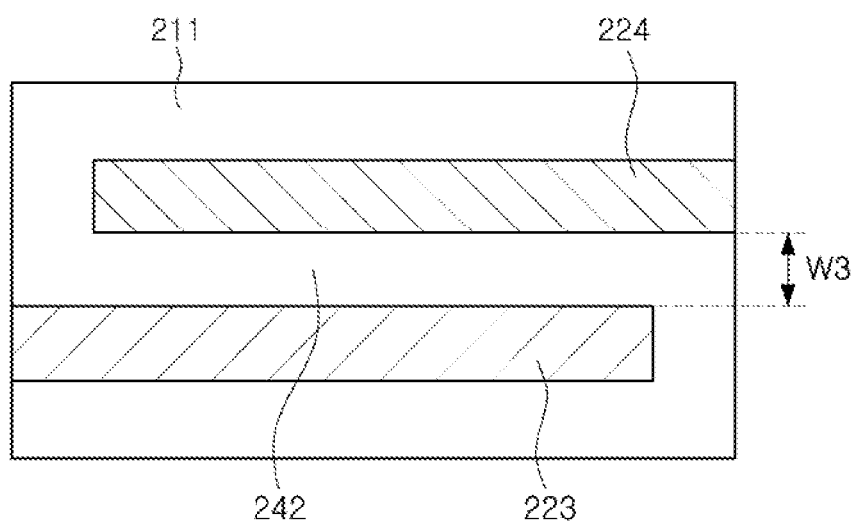
Figure 13:
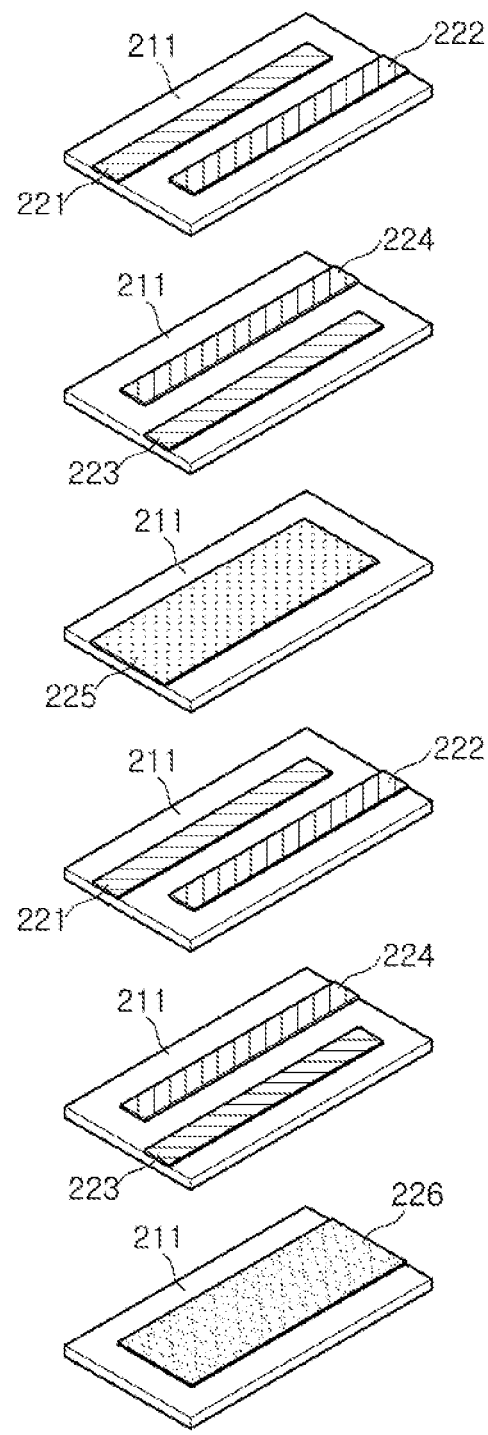

FIGS. 4 to 7 are plan views illustrating first to sixth internal electrode. FIG. 4 illustrates a first dielectric layer including a first internal electrode 121 and a second internal electrode 122 and on which the first coupling portion 141 is disposed. FIG. 5 illustrates a second dielectric layer including a third internal electrode 123 and a fourth internal electrode 124, and on which the second coupling portion 142 is disposed. FIGS. 5 and 6 illustrate a third dielectric layer on which the fifth internal electrode 125 and the sixth internal electrode 126 are disposed, respectively.

According to an embodiment of the present disclosure, the first dielectric layer to the third dielectric layer may be sequentially stacked. Referring to FIGS. 2 to 7, the first internal electrode 121, the second internal electrode 122, and the fifth internal electrode 125 may be disposed to be exposed to the third surface S3 of the body 110. In this case, the first internal electrode 121, the second internal electrode 122, and the fifth internal electrode 125 may be connected to a first external electrode 131 disposed on the third surface S3 of the body 110.

As in the above embodiment, referring to FIGS. 2 to 7, the third internal electrode 123, the fourth internal electrode 124, and the sixth internal electrode 126 may be disposed to be exposed to the fourth surface S4 of the body 110. In this case, the third internal electrode 123, the fourth internal electrode 124, and the sixth internal electrode 126 may be connected to a second external electrode 132 disposed on the fourth surface S4 of the body 110.

According to the above embodiment, the first coupling portion 141 and the second coupling portion 142 may be adhered to each other to increase mechanical strength of the chip. In addition, since the fifth internal electrode 125 and the sixth internal electrode 126 are disposed to oppose each other, the capacity of the multilayer ceramic capacitor according to the present disclosure may be further increased, thereby enabling implementation of a high-capacity chip.

In one example, a width W1 of a first coupling portion 141 and/or a second coupling portion 142 may be 0.1 to 0.7 times a width of the fifth internal electrode 125 or the sixth internal electrode 126. The width W1 of the first coupling portion 141 and/or the second coupling portion 142 may be 0.10 times or more, 0.12 times or more, 0.14 times or more, 0.16 times or more, 0.18 times or more or 0.20 times or more, 0.70 times or less, 0.68 times or less, 0.66 times or less, 0.64 times or less, 0.62 times or less, or 0.60 times or less, but is not limited thereto. The width W1 of the first coupling portion 141 and/or the second coupling portion 142 may satisfy the above range, thereby further improving mechanical reliability of the multilayer ceramic capacitor according to the present disclosure.

In an embodiment of the present disclosure, the body 110 may be configured such that a first dielectric layer, a second dielectric layer, and a third dielectric layer including the fifth internal electrode 125, or a first dielectric layer, a second dielectric layer, and a third dielectric layer including the sixth internal electrode 126 are sequentially stacked. According to the present embodiment, a third dielectric layer may be disposed such that the fifth internal electrode and the sixth internal electrode oppose each other with the first dielectric layer and the second dielectric layer interposed therebetween. When the structure is applied, it is possible to improve the mechanical strength of the chip due to the first and second coupling portions of the first dielectric layer and the second dielectric layer and to maximize an improvement in capacitance of the multilayer ceramic capacitor according to the present disclosure.

FIGS. 9 to 13 are views illustrating another embodiment of the present disclosure. Referring to FIGS. 9 to 13, in the multilayer ceramic capacitor according to the present embodiment, the first internal electrode 221, the third internal electrode 223, and the fifth internal electrode 225 may be exposed to the third surface S3 of the body 210. In this case, the first internal electrode 221, the third internal electrode 223, and the fifth internal electrode 225 may be connected to a first external electrode 231 disposed on the third surface S3 of the body 210.

According to an embodiment of the present disclosure, a second internal electrode 222, a fourth internal electrode 224, and a sixth internal electrode 226 may be exposed to the fourth surface S4 of the body 210. In this case, the second internal electrode 222, the fourth internal electrode 224, and the sixth internal electrode 226 may be connected to a second external electrode 232.

A material for forming the first to sixth internal electrodes 221, 222, 223, 224, 225, and 226 is not particularly limited, and may be formed using a conductive paste including one or more materials, for example, of silver (Ag), palladium (Pd), gold (Au), platinum (Pt), nickel (Ni), copper (Cu), tin (Sn), tungsten (W), palladium (Pd), titanium (Ti) and alloys thereof. As a printing method of the conductive paste, a screen printing method or a gravure printing method may be used, but the present disclosure is not limited thereto.

In different embodiments, the width W2 of coupling portion 222 and the width W3 of coupling portion 242 may be same or different. The ratio of widths W2 and W3 to the width of the fifth or sixth internal electrodes 225/226 may be in a range from about 0.1 to 0.7 in either case, in various embodiments.

According to an embodiment of the present disclosure, first and second external electrodes 131 and 132 may be disposed on both surfaces of the body 110. The first and second external electrodes 131 and 132 may be disposed on the third surface S3 and the fourth surface S4 of the body 110, respectively.

The first external electrode 131 and the second external electrode 132 may be connected to the aforementioned internal electrodes, respectively, and may have opposite polarities. Therefore, even if the first to sixth internal electrode described above are disposed on different dielectric layers, a fast multilayer ceramic capacitor according to the present disclosure may act as a single chip, and may realize high-capacity while improving mechanical strength and moisture resistance reliability of the chip itself.

A material for forming the first and second external electrodes 131 and 132 is not particularly limited, and may be formed using a conductive paste including one or more materials, for example, of silver (Ag), palladium (Pd), gold (Au), platinum (Pt), nickel (Ni), copper (Cu), tin (Sn), tungsten (W), palladium (Pd), titanium (Ti) and alloys thereof. A method for forming the first and second external electrodes 131 and 132 needs not be particularly limited. For example, the first and second external electrodes 131 and 132 may be formed by dipping a body into a paste containing a conductive metal and glass, or by transferring a dry film obtained by drying the metal paste onto the third surface S3 and the fourth surface S4 of the body 110.

As set forth above, according to an embodiment of the present disclosure, it is possible to provide a multilayer ceramic capacitor having excellent mechanical strength by using a coupling portion inside a dielectric layer.

According to another embodiment of the present disclosure, a multilayer ceramic capacitor having excellent moisture resistance reliability may be provided.

According to another embodiment of the present disclosure, a multilayer ceramic capacitor capable of preventing a crack or delamination while having a high capacity may be provided.

However, various and advantageous advantages and effects of the present disclosure are not limited to the above description, and will be more readily understood in the course of describing specific embodiments of the present disclosure.

While exemplary embodiments have been shown and described above, it will be apparent to those skilled in the art that modifications and variations could be made without departing from the scope of the present invention as defined by the appended claims.

What is claimed is:

1. A multilayer ceramic capacitor, comprising:
a body including a first layer on which a first internal electrode, a first coupling portion, and a second internal electrode are disposed, and which includes a dielectric layer, a second layer on which a third internal electrode, a second coupling portion, and a fourth internal electrode are disposed and which includes a dielectric layer, and a third layer on which a fifth internal electrode or a sixth internal electrode is disposed and which includes a dielectric layer, and including fifth and sixth surfaces opposed in a first direction, third and fourth surfaces opposed in a second direction, and first and second surfaces opposed in a third direction,
wherein the first to third layers are sequentially stacked,
wherein the first internal electrode, the second internal electrode, and the fifth internal electrode are exposed from the third surface of the body, and the third internal electrode, the fourth internal electrode, and the sixth internal electrode are exposed from the fourth surface of the body.

2. The multilayer ceramic capacitor of claim 1, wherein the first coupling portion and the second coupling portion are bonded to each other.

3. The multilayer ceramic capacitor of claim 1, wherein the first internal electrode, the second internal electrode, and the fifth internal electrode are connected to the first external electrode.

4. The multilayer ceramic capacitor of claim 1, wherein the third internal electrode, the fourth internal electrode, and the sixth internal electrode are connected to the second external electrode.

5. The multilayer ceramic capacitor of claim 1, wherein a width of the first coupling portion and the second coupling portion is in a range from 0.1 to 0.7 times a width of the fifth internal electrode or the sixth internal electrode.

6. The multilayer ceramic capacitor of claim 1, wherein the body is configured such that a first layer, a second layer, and a third layer including the fifth internal electrode or a first layer, a second layer, and a third layer including the sixth internal electrode are sequentially stacked.

7. The multilayer ceramic capacitor of claim 1, wherein the first internal electrode, the third internal electrode, and the fifth internal electrode are connected to the first external electrode.

8. The multilayer ceramic capacitor of claim 1, wherein the second internal electrode, the fourth internal electrode, and the sixth internal electrode are connected to the second external electrode.

9. The multilayer ceramic capacitor of claim 1, wherein the first external electrode and the second external electrode have opposite polarities from each other.

10. The multilayer ceramic capacitor of claim 1, wherein a cover portion disposed on the first and second surfaces of the body.

11. A multilayer ceramic capacitor, comprising:
a first layer having a first internal electrode and a second internal electrode spaced apart from the first internal electrode disposed thereon, and including a layer;
a second layer having a third internal electrode and a fourth internal electrode spaced apart from the third internal electrode disposed thereon, and including a layer; and
a third layer having a fifth internal electrode or a sixth internal electrode disposed thereon, and including a layer, the fifth internal electrode and the sixth internal electrode having opposite polarities, the first through third layers being sequentially stacked in a thickness direction to form a body,
wherein the first internal electrode, the second internal electrode, and the fifth internal electrode are exposed from a surface of the body, and the third internal electrode, the fourth internal electrode, and the sixth internal electrode are exposed from another surface of the body opposing the surface of the body exposing the first, second and fifth internal electrodes.

12. The multilayer ceramic capacitor of claim 11, wherein the first and second internal electrodes are connected to the first external electrode, and the third and fourth internal electrodes are connected to the second external electrode.

13. The multilayer ceramic capacitor of claim 11, wherein the first and third internal electrodes are connected to the first external electrode, and the second and fourth internal electrodes are connected to the second external electrode.

14. The multilayer ceramic capacitor of claim 11, wherein a portion of the first layer separating the first and second internal electrodes contacts a portion of the second layer separating the third and fourth internal electrodes when the first and second dielectric layers are stacked in the body.

15. The multilayer ceramic capacitor of claim 11, wherein a ratio of a width of a portion of the first layer separating the first and second internal electrodes, or a width of a portion of the second layer separating the third and fourth internal electrodes, to a width of the fifth or the sixth internal electrodes is in a range from 0.1 to 0.7.

16. The multilayer ceramic capacitor of claim 1, wherein the first coupling portion separates the first and second internal electrodes.

17. The multilayer ceramic capacitor of claim 11, wherein the first layer includes a first coupling portion separating the first and second internal electrodes.

* * * * *